H. W. KARDELL.
TRACTION WHEEL.
APPLICATION FILED MAR. 12, 1917.
1,318,880.
Patented Oct. 14, 1919.
3 SHEETS—SHEET 1.
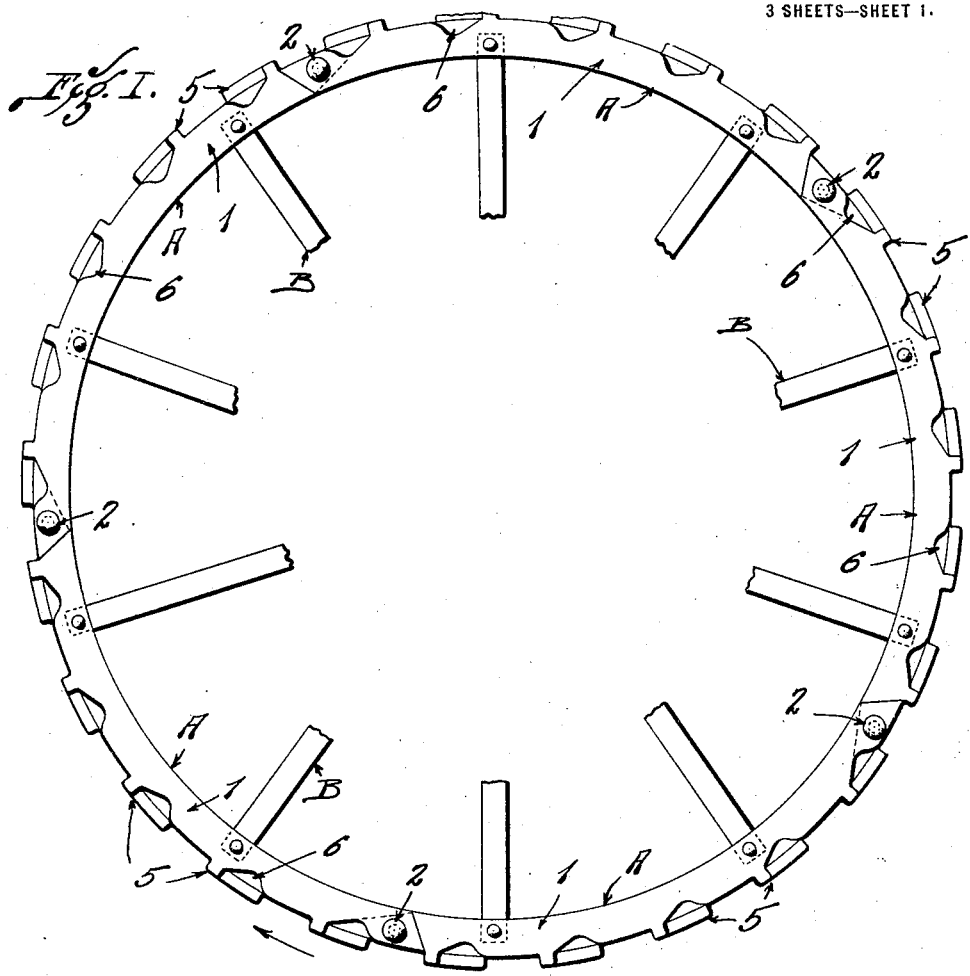
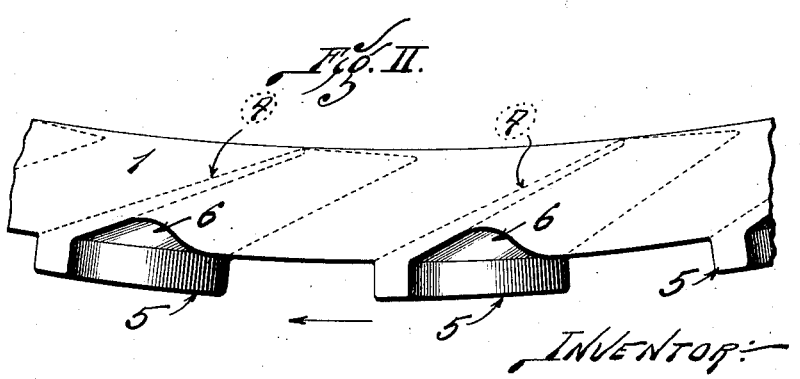
INVENTOR:
H. W. Kardell,
By Knight + Cook, attys.

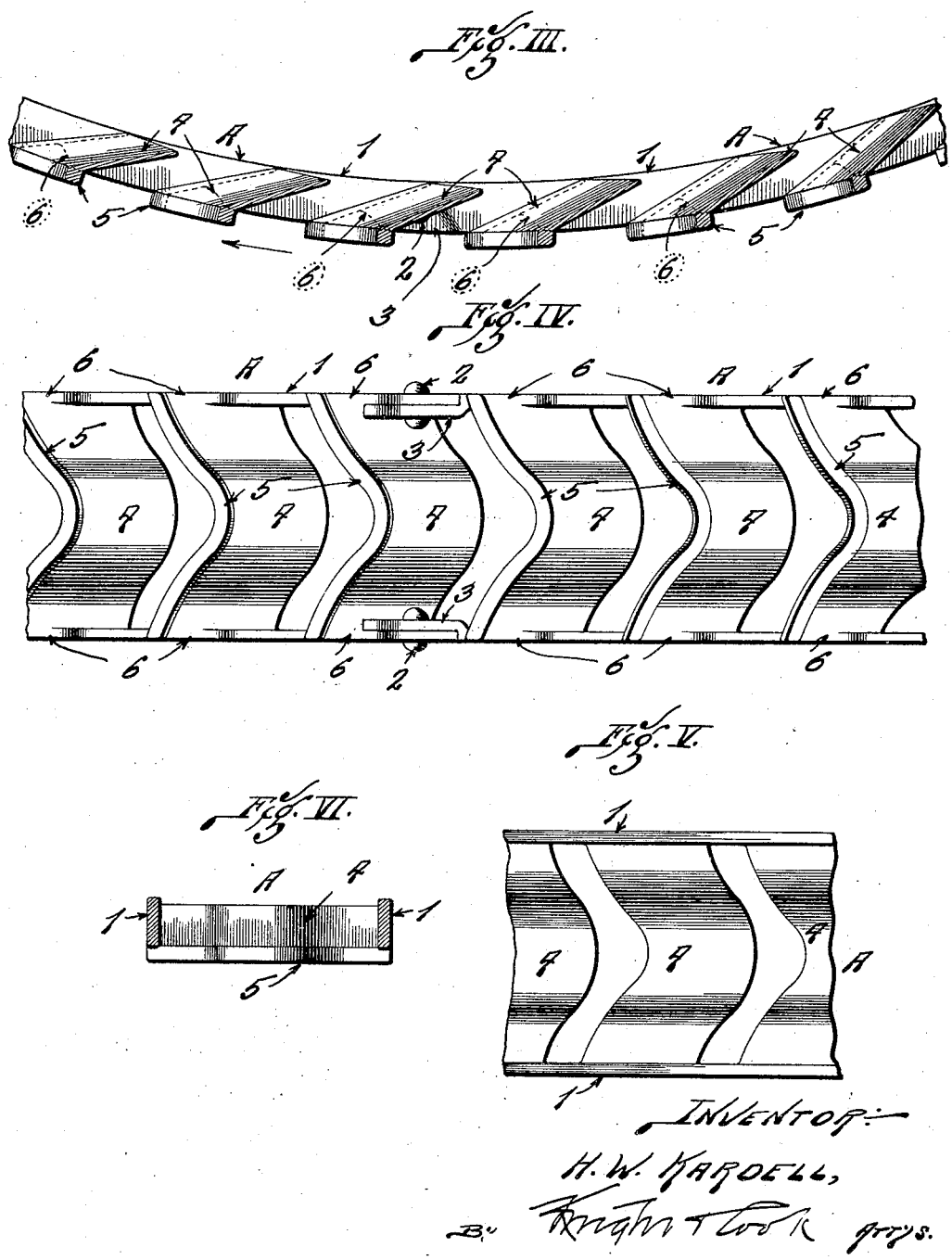

H. W. KARDELL.
TRACTION WHEEL.
APPLICATION FILED MAR. 12, 1917.
1,318,880.
Patented Oct. 14, 1919.
3 SHEETS—SHEET 3.
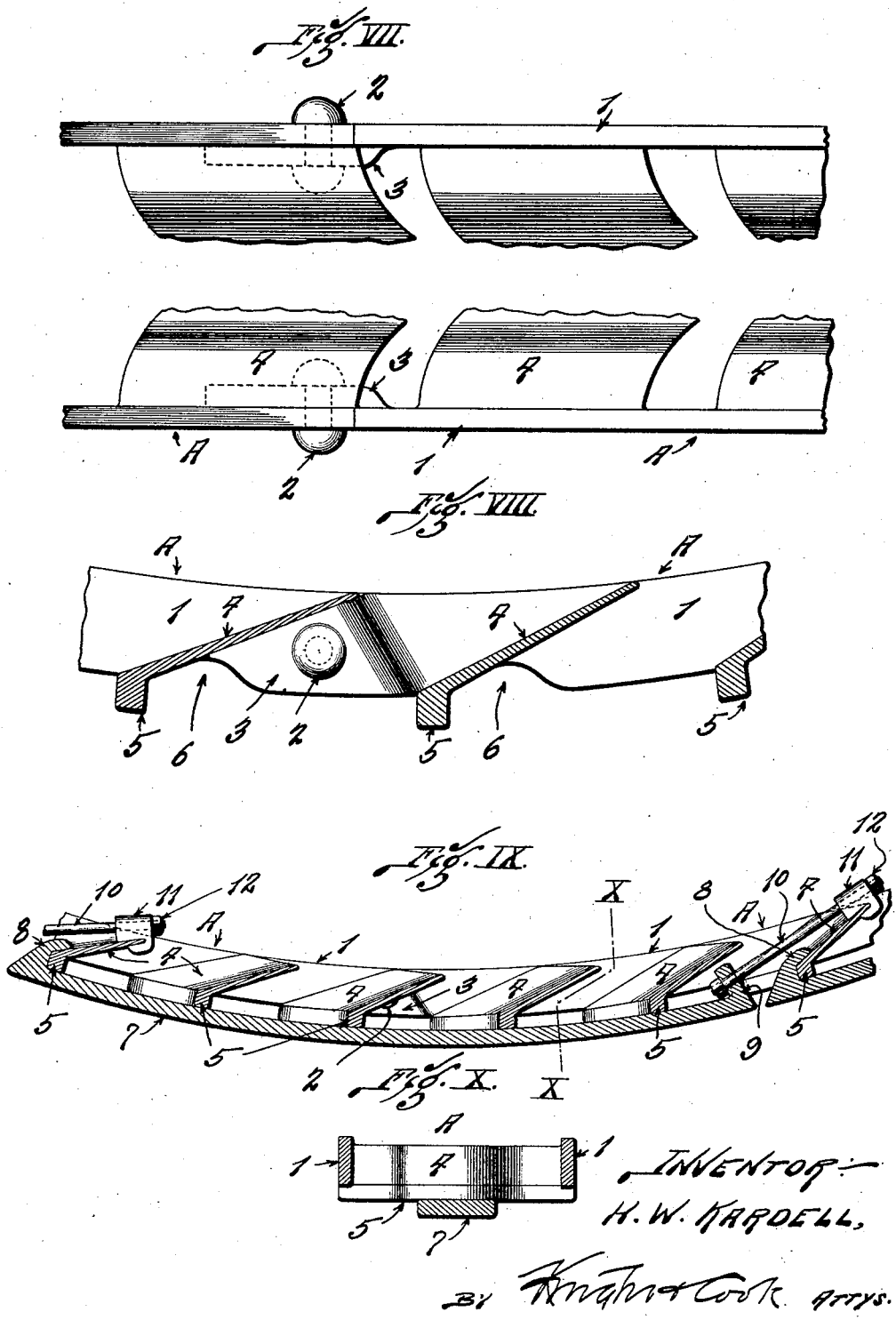

UNITED STATES PATENT OFFICE.

HENRY W. KARDELL, OF ST. LOUIS, MISSOURI, ASSIGNOR TO KARDELL TRACTOR & TRUCK COMPANY, A CORPORATION OF DELAWARE.

TRACTION-WHEEL.

1,318,880.     Specification of Letters Patent.     Patented Oct. 14, 1919.

Application filed March 12, 1917. Serial No. 154,228.

*To all whom it may concern:*

Be it known that I, HENRY W. KARDELL, a citizen of the United States of America, a resident of the city of St. Louis, State of Missouri, have invented certain new and useful Improvements in Traction-Wheels, of which the following is a full, clear, and exact description, reference being had to the accompanying drawings, forming a part of this specification.

My invention relates to a traction wheel for use on farm tractors or other vehicles intended to be operated on soft soil, the invention having for one of its objects the production of a wheel of this kind, the rim of which is composed of a plurality of segments, thereby making it possible to cast the ground tread elements of the rim as integral parts with the frame of the rim. Another object of the invention is to provide efficient connections between the rim segments. A further object of the invention is to so form the tread elements as to provide for lateral movement of mud or slippery earth when it is encountered by these elements, so that it will be thrown sidewise from the periphery of the wheel, in order that the gripping elements may obtain a more perfect hold. Still another object of the invention is to provide auxiliary tread means by which the ground gripping elements are held out of contact with a roadway when the traction wheel is moving upon a roadway or hard surface.

Figure I is a side elevation of the rim and spokes of my traction wheel, the hub of the wheel being omitted.

Fig. II is an enlarged side view of a fragment of the wheel rim.

Fig. III is an enlarged fragmentary longitudinal section.

Fig. IV is an enlarged view looking at the periphery of a fragment of the wheel rim, showing the joint at the junction of two of the rim segments.

Fig. V is a view of a fragment of the wheel rim, looking at the inner face thereof.

Fig. VI is a cross section through the rim taken at a point between two of the tread webs.

Fig. VII is an enlarged view looking at the inner face of the wheel rim at the location of one of the joints between rim segments, the central portions of the tread webs being broken out.

Fig. VIII is an enlarged longitudinal fragmentary section at the location of one of the joints in the wheel rim.

Fig. IX is an enlarged fragmentary section showing one of the auxiliary tread sections.

Fig. X is a cross section on line X—X, Fig. IX.

The rim of my traction wheel is composed of a plurality of segments A having side webs 1, the said side webs being joined to each other by fastening devices 2, preferably rivets. The side webs are alined at the ends of the segments so that said webs abut, and, to secure overlapping relation, said side webs are each formed at one end with a tongue 3 which is offset laterally from the body of the web (see Figs. IV, VII and VIII). The fastening devices 2 extend through these tongues and the straight end portions of the side webs in the next adjacent segment.

The rim, built up of segments A joined to each other as described, is connected to a suitable hub (not shown) by spokes B which are riveted or otherwise secured to the side webs of said segments.

Each rim segment A comprises the side webs 1 and transverse tread webs 4, the latter being arranged at tangents to the axis of the wheel rim and bulging outwardly from the side webs to the transverse center of the rim. The tread webs slope inwardly from the periphery of the rim and rearwardly relative to the direction (indicated by arrows Figs. I, II and III) in which the rim is intended to turn when revolving on the ground during forward movement of a vehicle in which the rim is used.

At the front edges of the tread webs, which are those edges nearest the periphery of my wheel rim, are ground gripping toes 5. These toes correspond in their contour to the contour of the tread webs from which they extend at angles, as seen in the drawings. The gripping toes are of approximately U-shape and they, therefore, bite into the ground in very much the same manner as a horse-shoe so that the purchase obtained is one very unlikely to result in slippage. The rear convex faces of the gripping toes lead to the sides of the wheel rim and extend to the outer side faces of said rim.

The side webs 1 of the segments A are eliminated immediately back of the toes 5, providing gaps 6 through which soft mud, when encountered, may pass after moving forwardly and laterally along the outer faces of the tread webs while said tread webs are in contact with the ground.

During the revolutions of my traction wheel the tread elements of the wheel rim as indicated by arrows Figs. I, II and III, each ground gripping toe 5 contacting with the ground before the tread web by which it is carried touches the ground. The tread web then reaches the ground adjacent to said toe and compresses the ground instead of sinking thereinto as the toe does. The tread webs being arranged at tangents to the axis of the rim and being separated from each other support the load imposed upon them and at the same time permit soil to pass readily between them and not become lodged between the webs.

A highly important characteristic of my traction wheel is that it is self cleaning, and earth which is liable to adhere to the tread of a traction wheel, for example, mud, is constantly discharged laterally from the tread webs 4, this being due to the peculiar shape of the tread webs. These tread webs, being bulged outwardly relative to the axis of the traction wheel contact first with the ground, and as the webs lead laterally at each side of their apexes, and also forwardly toward the ground gripping toes 5 and the gaps 6 at the sides of the wheel rim, any soft earth liable to adhere to the tread webs is caused to move in the directions in which said webs slope. Consequently, such earth is expressed from beneath the tread webs through the gaps 6, and there is no opportunity for the tread members and the ground gripping toes carried thereby gathering accumulations of earth to interfere with the intended surface of the traction wheel in which they are incorporated, even though such wheel is being operated in soil of an adhesive nature.

7 designates auxiliary tread sections secured to the rim of my traction wheel at its periphery, and adapted to support the transverse tread elements out of contact with the ground when the wheel rim is traversing a hard roadway. These rim sections are of bar form in cross section and curved in conformity with the peripheral curvature of the wheel rim. At one end of each section 7 is a rearwardly extending hook 8 adapted to embrace the forward portion of one of the transverse tread webs 4, while at the opposite end of said section is an inwardly extending arm 9 adapted to occupy a position between two of the transverse tread webs located at a distance from the web engaged by the hook 8. The arm 9 receives a connecting rod 10 arranged substantially parallel with two of the transverse tread webs, between which it is positioned, and upon this connecting rod is a hook lock 11 which engages the rear end of a transverse tread web 4 immediately back of the rear end of the auxiliary tread section 7. The connecting rod 10 is provided with a nut 12, and, when this nut is adjusted upon said rod, the block 11 is so moved as to draw the auxiliary tread section snugly into engagement with the toes 5 on the transverse tread members 4, and hold said sections firmly in place at the periphery of the wheel rim.

I claim:—

1. A traction wheel rim comprising side webs and transverse tread webs between said side webs, said transverse webs being arranged in toto diagonally relative to the axis of the rim and bulging outwardly relative to said axis from the side webs to the transverse center of the rim.

2. A traction wheel rim comprising side webs and transverse tread webs between said side webs, said transverse tread webs being bulged outwardly relative to the axis of the rim and extending in toto diagonally relative to said axis, each of said transverse webs being provided with a ground gripping toe.

3. A traction wheel rim comprising side webs and transverse tread webs between said side webs, said transverse tread webs being bulged outwardly relative to the axis of the rim and extending in toto diagonally relative to said axis, each of said transverse webs being provided with a U-shaped ground gripping toe.

4. A traction wheel rim comprising side webs and transverse tread webs between said side webs, said transverse tread webs being provided with ground gripping toes and being bulged outwardly relative to the axis of the rim and extending in toto diagonally relative to said axis, said side webs being partially omitted adjacent to said ground gripping toes to provide gaps through which earth, moving along the sloping face of said tread webs, may pass from beneath the wheel rim.

5. The combination with a wheel rim having transverse tread webs, of auxiliary tread sections fitted to said webs, each of said sections being provided at one end with a hook for engagement with a tread web, and at its other end with an inwardly extending arm, a hook block for engagement with a second tread web, and a connecting rod uniting said hook block to the inwardly extending arm of said auxiliary tread section.

In testimony that I claim the foregoing I hereunto affix my signature.

HENRY W. KARDELL.

Copies of this patent may be obtained for five cents each, by addressing the "Commissioner of Patents, Washington, D. C."